United States Patent Office

3,629,128
Patented Dec. 21, 1971

3,629,128
STABILIZATION OF CHLORINATED HYDROCARBONS
John Henry Rains, Baton Rouge, La., assignor to Ethyl Corporation, New York, N.Y.
No Drawing. Continuation-in-part of application Ser. No. 681,019, Nov. 6, 1967. This application June 26, 1968, Ser. No. 740,039
Int. Cl. C09d 9/00; C11d 7/50; C23g 5/02
U.S. Cl. 252—171
20 Claims

ABSTRACT OF THE DISCLOSURE

Stabilized methyl chloroform and method for stabilizing methyl chloroform against the formation of acidic products therein by supplying thereto 1,4-dioxane, nitromethane, butylene oxide, N-methylpyrrole, and an amine selected from diisopropylamine, diallylamine, isobutylamine and n-butylamine.

CROSS REFERENCE TO RELATED APPLICATION

This application is a continuation-in-part of application Ser. No. 681,019, filed Nov. 6, 1967, now abandoned.

BACKGROUND OF THE INVENTION

Chlorinated hydrocarbons today find many uses in industry. One chlorinated hydrocarbon in particular, 1,1,1-trichloroethane, frequently referred to as methylchloroform, is valuable for degreasing metals. This compound is unstable, however, and undergoes reactions with air and the metals it contacts, thereby yielding products such as hydrogen chloride which seriously impair its utility. Heretofore small quantities of addition agents have been added to stabilize methylchloroform and/or to neutralize the products formed. However, none of the additives and none of the combinations of additives disclosed in the prior art have successfully completely prevented the accumulation of metal corrosive acid in methylchloroform.

Representative of the prior art is British Pat. 1,038,363 which discloses the stabilizer combination of 1,4-dioxane and N-methylpyrrole. While this combination of stabilizers is particularly good for the stabilization of methylchloroform, it is nonetheless not completely successful, and under rigorous conditions it is prone to failure. By contrast, it has now been found that by the addition of three more stabilizer components to the combination disclosed in the British patent a stabilized methylchloroform is produced which can be used under the most rigorous metal degreasing conditions without causing corrosion or leading to deterioration of the methylchloroform.

SUMMARY OF THE INVENTION

The present invention provides stabilized methylchloroform and a method for stabilizing methylchloroform against the formation of acidic products therein which comprises supplying thereto 1,4-dioxane, nitromethane, butylene oxide, N-methyl-pyrrole, and an amine selected from the group consisting of diisopropylamine, diallylamine, isobutylamine and n-butylamine.

DESCRIPTION OF THE PREFERRED EMBODIMENTS

Heretofore it has not been possible to completely stop corrosion of degreasing apparatus by methylchloroform. While the prior art has substantially reduced corrosion caused by methylchloroform by the addition thereto of various stabilizers and combinations of stabilizers, it remained for the present invention to completely eliminate corrosion.

According to the present invention there is provided a stabilized methylchloroform and a method for stabilizing methylchloroform against the formation of acidic products therein by supplying thereto about 1 to 5 percent by weight 1,4-dioxane, about 0.1 to 3 percent by weight nitromethane, about 0.1 to 3 percent by weight butylene oxide, about 0.0005 to 0.05 percent by weight N-methylpyrrole, and about 0.0005 to 0.05 percent by weight of an amine. Suitable amines include diisopropylamine, diallylamine, isobutylamine and n-butylamine. Diisopropylamine is preferred.

If desired, about 0.05 to 0.5 percent by weight epichlorohydrin may be added to methylchloroform stabilized with the above noted stabilizer system. Epichlorohydrin, which is an epoxide like butylene oxide, primarily aids stabilization in the liquid phase, since it has a higher boiling point than butylene oxide.

A highly preferred composition is methylchloroform stabilized with about 3 percent by weight 1,4-dioxane, about 0.4 percent by weight nitromethane, about 0.3 percent by weight butylene oxide, about 0.005 percent by weight N-methylpyrrole, and about 0.003 percent by weight amine, especially diisopropylamine.

It is theorized, although the present invention is not limited to this theory, that an epoxide, such as butylene oxide, is a slow acting hydrogen chloride acceptor while an amine, such as diisopropylamine, is a fast acting hydrogen chloride acceptor. Hence, the epoxide cannot by itself prevent local acidity buildup which leads to spot corrosion. The amine, by contrast, quickly stops local acidity buildup by immediately complexing with any hydrogen chloride present. The slower acting epoxide then regenerates the amine by itself complexing with the hydrogen chloride previously complexed with the amine.

It is further theorized, although again the present invention is not limited to this theory, that the other stabilizing additives also serve certain specific functions. Hence, the 1,4-dioxane additive is necessary for the prevention of aluminum corrosion while the nitromethane additive prevents iron corrosion where water is present in the stabilized system. The N-methylpyrrole additive is an antioxidant for 1,4-dioxane; thus, it stabilizes one of the stabilizers. In conclusion, each of the stabilizing additives of the present invention serves a necessary and vital function, and the omission of any one would result in an incomplete stabilizer system.

In order that those skilled in the art can thus appreciate the process of this invention, the following examples are given by way of description and not by way of limitation.

All tests set forth by the following examples were run for seven days unless severe corrosion appeared beforehand. In accordance with the testing method, a 500 ml. sample was placed into a glass cylinder 3 inches (diameter) by 20 inches (high) by ¼ inch (glass thickness). The cylinder and contents were placed on an electric hotplate. The hotplate was controlled so that the liquid phase showed 75 to 80° C. A thermometer was suspended into the cylinder with the thermometer bulb about 1 inch below the surface of the liquid level. A piece of aluminum wire and an aluminum sheet metal strip, 2½ inches by 18 inches, were used in each example below except Example I where an aluminum metal strip 3 inches by 6 inches was employed. Before use, each aluminum metal strip was flushed with 1,1,1-trichloroethane and wiped dry with tissue before being placed in the test cylinder.

| Example | Time, days | Sample composition | Test observations |
|---|---|---|---|
| I | 6 | 1,1,1-trichloroethane; 3.0% 1,4-dioxane; 0.4% nitromethane. | Severe corrosion; solution acidic. |
| II | 6 | 1,1,1-trichloroethane; 3.0% 1,4-dioxane; 0.3% butylene oxide. | Do. |
| III | 6 | 1,1,1-trichloroethane; 3.0% 1,4-dioxane; 0.0050% N-methylpyrrole. | Solution yellow by end of 1st day; severe corrosion; solution acidic. |
| IV | 6 | 1,1,1-trichloroethane; 3.0% 1,4-dioxane; 0.0030% diisopropylamine. | Severe corrosion; solution acidic. |
| V | 1 1/24[1] | 1,1,1-trichloroethane; 0.3% butylene oxide; 0.0030% diisopropylamine. | Severe corrosion; tar present; solution acidic. |
| VI | 1 1/24[1] | 1,1,1-trichloroethane; 0.0030% diisopropylamine. | Do. |
| VII | 7 | 1,1,1-trichloroethane; 2.84% 1,4-dioxane; 0.3921% nitromethane; 0.2601% butylene oxide. | Severe corrosion; odor of acetic acid; color brown. |
| VIII | 7 | 1,1,1-trichloroethane; 2.84% 1,4-dioxane; 0.3921% nitromethane; 0.2601% butylene oxide; 0.005% N-methylpyrrole. | Spot corrosion on Al wire; no Al strip corrosion; odor normal; color very slight yellowish. |
| IX | 7 | 1,1,1-trichloroethane; 2.84% 1,4-dioxane; 0.3921% nitromethane; 0.2601% butylene oxide; 0.01% N-methylpyrrole. | Spot corrosion on Al wire; no corrosion on Al strip; color very slight yellowish. |
| X | 7 | 1,1,1-trichloroethane; 2.84% 1,4-dioxane; 0.3921% nitromethane; 0.2601% butylene oxide; 0.005% N-methylpyrrole; 0.003% diisopropylamine. | No visible corrosion; odor normal; color clear. |
| XI | 7 | 1,1,1-trichloroethane; 2.84% 1,4-dioxane; 0.3921% nitromethane; 0.2601% butylene oxide; 0.005% N-methylpyrrole; 0.003% diisopropylamine; (added 10 g. zinc and 1/4 inch of Al and Mg metal fines to bottom of cylinder). | Do. |
| XII | 7 | 1,1,1-trichloroethane; 2.84% 1,4-dioxane; 0.3921% nitromethane; 0.2601% butylene oxide; 0.005% N-methylpyrrole; 0.003% diisopropylamine (50 gms. of Al turnings plus cutting oil added to test cylinder). | No visible corrosion; odor normal; color slight yellowish due to cutting oil color. |

[1] 1 hour.

Examples XI and XII, which demonstrate the present invention along with Example X, were run under especially rigorous conditions which normally induce corrosion. Namely, aluminum and magnesium metal fines and aluminum turnings plus cutting oil were added to the test cylinders. However, in each example no visible corrosion was observable. This compares with Examples I to IX in each of which one or more of the stabilizers of the present invention was missing and wherein, in all instances, corrosion occurred.

The following run was made using a steel strip instead of an aluminum strip and wire as in the previous examples. No corrosion was observed at the critical areas of the steel strip, namely in the vapor area and the liquid area. A brown stain did develop at the liquid-vapor interface. However, this did not indicate that the stabilized solvent was unsuitable for steel degreasing since the metal piece is normally either completely in the vapor or completely in the liquid phase.

| Example | Time, days | Sample composition | Test observations |
|---|---|---|---|
| XIII | 7 | 1,1,1-trichloroethane; 2.84% 1,4-dioxane; 0.3921% nitromethane; 0.2601% butylene oxide; 0.005% N-methylpyrrole; 0.003% diisopropylamine. | Steel strip brown stained seventh day at liquid-vapor interface level; no corrosion visible on any areas of strip. |

Examples XIV through XVI, run with aluminum strips and wire as in Examples I–XII further demonstrate the present invention with the exception that other amines are substituted for diisopropylamine. Results are considered to be excellent since no corrosion of the metal was observed.

| Example | Time, days | Sample composition | Test observations |
|---|---|---|---|
| XIV | 14 | 1,1,1-trichloroethane; 3.00% 1,4-dioxane; 0.4% nitromethane; 0.3% butylene oxide; 0.005% N-methylpyrrole; 0.003% diallylamine. | No visible corrosion; odor normal; color yellow. |
| XV | 14 | 1,1,1-trichloroethane; 3.00% 1,4-dioxane; 0.4% nitromethane; 0.3% butylene oxide; 0.005% N-methylpyrrole; 0.003% isobutylamine. | No visible corrosion; odor normal; color turned brown during second week. |
| XVI | 14 | 1,1,1-trichloroethane; 3.00% 1,4-dioxane; 0.4% nitromethane; 0.3% butylene oxide; 0.005% N-methylpyrrole; 0.003% n-butylamine. | No visible corrosion; odor normal; color turned brown during second week. |

It is to be understood that the present invention is not limited by the specific embodiments described hereinabove, but includes such changes and modifications as may be apparent to one skilled in the art upon reading the appended claims.

I claim:

1. A method for stabilizing methylchloroform against the formation of acidic products therein which comprises adding thereto stabilizing quantities of 1,4-dioxane, nitromethane, butylene oxide, N-methylpyrrole, and an amine selected from the group consisting of diisopropylamine, diallylamine, isobutylamine and n-butylamine.

2. The method of claim 1 wherein the amine is diisopropylamine.

3. The method of claim 2 wherein the stabilizers are present in concentrations of about 1 to 5 percent by weight 1,4-dioxane, about 0.1 to 3 percent by weight nitromethane, about 0.1 to 3 percent by weight butylene oxide, about 0.0005 to 0.05 percent by weight N-methylpyrrole, and about 0.0005 to 0.05 percent by weight diisopropylamine.

4. The method of claim 3 wherein epichlorohydrin is also supplied to the methylchloroform in a concentration of about 0.05 to 0.5 percent by weight of the stabilized methylchloroform.

5. A methylchloroform composition containing stabilizing quantities in amounts to prevent the formation of acidic products of 1,4-dioxane, nitromethane, butylene oxide, N-methylpyrrole, and an amine selected from the group consisting of diisopropylamine, diallylamine, isobutylamine and n-butylamine.

6. The composition of claim 5 wherein the amine is diisopropylamine.

7. The composition of claim 6 wherein the stabilizers are present in the concentrations of about 1 to 5 percent by weight 1,4-dioxane, about 0.1 to 3 percent by weight nitromethane, about 0.1 to 3 percent by weight butylene oxide, about 0.0005 to 0.05 percent by weight N-methylpyrrole, and about 0.0005 to 0.05 percent by weight disopropylamine.

8. The composition of claim 7 wherein 0.05 to 0.5 percent by weight epichlorohydrin is also present in the methylchloroform.

9. In a process wherein a metal selected from the class consisting of iron, aluminum, and copper is exposed to hot 1,1,1-trichloroethane containing stabilizing quantities of 1,4-dioxane, nitromethane, and N-methylpyrrole, the stabilized 1,1,1-trichloroethane normally causing tarring and corrosion of said metal under rigorous use conditions, the improvement comprising incorporating into said stabilized 1,1,1-trichloroethane about 0.1 to 3 percent by weight butylene oxide and about 0.0005 to 0.05 percent by weight of an amine selected from the group consisting of diisopropylamine, diallylamine, isobutylamine and n-butylamine to inhibit said tarring and corrosion.

10. The method of claim 9 wherein the amine is diisopropylamine.

11. The process of claim 9 wherein about 0.05 to 0.5 percent by weight epichlorohydrin is also incorporated into said stabilized 1,1,1-trichloroethane.

12. In a method of refining 1,1,1-trichloroethane in the presence of a metal selected from the class consisting of iron, aluminum, and copper, said 1,1,1-trichloroethane containing stabilizing quantities of 1,4-dioxane, nitromethane, and N-methylpyrrole, the stabilized 1,1,1-trichloroethane normally causing tarring and corrosion of said metal under rigorous use conditions, the improvement comprising incorporating into said stabilized 1,1,1-trichloroethane about 0.1 to 3 percent by weight butylene oxide and about 0.0005 to 0.05 percent by weight of an amine selected from the group consisting of diisopropylamine, diallylamine, isobutylamine and n-butylamine to inhibit said tarring and corrosion.

13. The method of claim 12 wherein the amine is diisopropylamine.

14. The process of claim 12 wherein about 0.05 to 0.5 percent by weight epichlorohydrin is also incorporated into said stabilized 1,1,1-trichloroethane.

15. In a process of degreasing metal surfaces, the metal being selected from the class consisting of iron, aluminum, and copper, wherein the surfaces are exposed to hot 1,1,1-trichloroethane containing stabilizing quantities of 1,4-dioxane, nitromethane, and N-methylpyrrole, the stabilized 1,1,1-trichloroethane normally causing tarring and corrosion of said metal under rigorous use conditions, the improvement comprising incorporating into said stabilized 1,1,1-trichloroethane about 0.1 to 3 percent by weight butylene oxide and about 0.0005 to 0.05 percent by weight of an amine selected from the group consisting of diisopropylamine, diallylamine, isobutylamine and n-butylamine to inhibit said tarring and corrosion.

16. The process of claim 15 wherein the amine is diisopropylamine.

17. The process of claim 15 wherein about 0.05 to 0.5 percent by weight epichlorohydrin is also incorporated into said stabilized 1,1,1-trichloroethane.

18. In a 1,1,1-trichloroethane composition containing stabilizing quantities of 1,4-dioxane, nitromethane, and N-methylpyrrole, the stabilized 1,1,1-trichloroethane normally causing tarring and corrosion under rigorous conditions in the presence of iron, aluminum, or copper, the improvement wherein said stabilized 1,1,1-trichloroethane has incorporated therein about 0.1 to 3 percent by weight butylene oxide and about 0.0005 to 0.05 percent by weight of an amine selected from the group consisting of diisopropylamine, diallylamine, isobutylamine and n-butylamine to inhibit said tarring and corrosion.

19. The composition of claim 18 wherein the amine is diisopropylamine.

20. Methylchloroform stabilized with about 3 percent by weight 1,4-dioxane, about 0.4 percent by weight nitromethane, about 0.3 percent by weight butylene oxide, about 0.005 percent by weight N-methylpyrrole, and about 0.003 percent by weight diisopropylamine.

References Cited

UNITED STATES PATENTS

| | | | |
|---|---|---|---|
| 3,049,571 | 8/1962 | Brown | 252—171 UX |
| 3,189,552 | 6/1965 | Sims | 252—171 UX |
| 3,265,747 | 8/1966 | Cormang et al. | 260—652.5 |
| 3,326,989 | 6/1967 | Cormang et al. | 260—652.5 |

FOREIGN PATENTS

| | | | |
|---|---|---|---|
| 1,357,913 | 5/1963 | France | 252—171 |

LEON D. ROSDOL, Primary Examiner

W. E. SCHULZ, Assistant Examiner

U.S. Cl. X.R.

106—311; 252—364; 260—652.5